United States Patent [19]
Gerk et al.

[11] Patent Number: 5,368,420
[45] Date of Patent: Nov. 29, 1994

[54] ROTATING DRILL HEAD WITH A BORING BAR WHICH IS PIVOTABLE BY A SLIGHT DISTANCE VERTICALLY TO THE AXIS OF ROTATION BY FLUIDIC MEANS

[75] Inventors: Wilfried Gerk, Roedermark; Hartmut Hirt, Gelnhausen, both of Germany

[73] Assignee: Samson AG, Frankfurt, Germany

[21] Appl. No.: 61,863

[22] Filed: May 14, 1993

[30] Foreign Application Priority Data

Jun. 4, 1992 [DE] Germany .................... 4218467

[51] Int. Cl.⁵ ............................................ B23B 51/00
[52] U.S. Cl. .................................... 408/156; 408/180
[58] Field of Search ............. 408/146, 147, 153, 156, 408/158, 180

[56] References Cited

U.S. PATENT DOCUMENTS

| | | | |
|---|---|---|---|
| 3,007,356 | 11/1961 | Jones | 408/147 |
| 3,379,077 | 4/1968 | Gustafson | 408/156 |
| 5,116,171 | 5/1992 | Gerk et al. | 408/147 |

FOREIGN PATENT DOCUMENTS

| | | | |
|---|---|---|---|
| 51887 | 8/1966 | Poland | 408/180 |
| 02010 | 3/1990 | WIPO | 408/156 |

Primary Examiner—Daniel W. Howell
Attorney, Agent, or Firm—McAulay Fisher Nissen Goldberg & Kiel

[57] ABSTRACT

A cutting chisel holder which is controlled by pressure and constructed as a rotary drill head which can be precisely adjusted by hydraulic means has a cutting chisel, which can be clamped in, with a base and a driven member which is movable relative to the base, and has a pressure chamber arranged between the base and driven member, as well as a pressure medium feed. The driven member moves parallel to itself under the influence of the pressure medium and, in doing so, causes a movement of the cutting chisel on a curved path extending approximately vertically to the axis of rotation of the drill head by parts acting mechanically without friction.

5 Claims, 1 Drawing Sheet

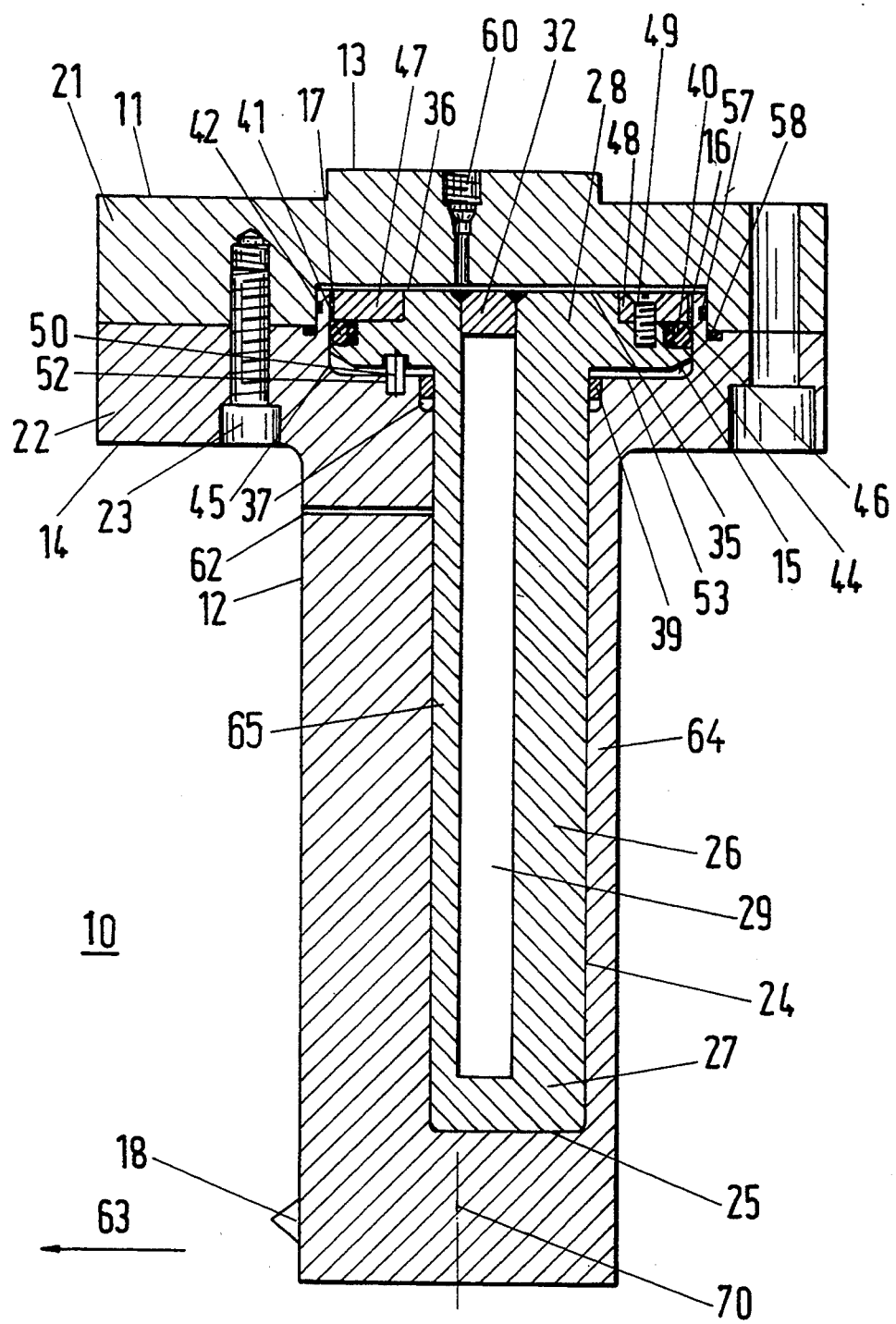

ROTATING DRILL HEAD WITH A BORING BAR WHICH IS PIVOTABLE BY A SLIGHT DISTANCE VERTICALLY TO THE AXIS OF ROTATION BY FLUIDIC MEANS

BACKGROUND OF THE INVENTION a) Field of the Invention

The invention is directed to a rotating drill head with a boring bar which can be swiveled by small amounts vertical to the axis of rotation by fluidic means and serves to receive a cutting chisel, and with a pressure chamber for receiving a driven member which acts on the boring bar via a cylindrical tappet located in an eccentric, axially parallel bore hole of the boring bar.

b) Background Art

In a known construction of such a drill head, the driven member is a plate having projections and resting thereon. The tappet situated in the eccentric bore hole of the boring bar rests on the side of the plate which faces away. When acted upon in the axial direction, this tappet causes the boring bar to be stretched along its thinner wall so that the boring bar swivels toward the thicker wall and, in doing so, impresses upon the cutting chisel a circular advancing motion in the $\mu$ range transverse to the axis of rotation (see U.S. Pat. No. 3,007,356, FIG. 2).

Since the tappet contacts the plate eccentrically, the plate and tappet form a lever gearing which is subject to repetitive friction. Further, the tappet is acted upon obliquely as a result of this construction and accordingly experiences lateral deflections which lead to jamming of the tappet in the bore hole. Frictional and clamping forces prevent such a drill head from following slight changes in pressure whose effect does not exceed the frictional forces. When larger forces occur the cutting chisel position cannot be associated with the control pressure in a reproducible manner so that different cutting chisel positions result also when the control pressure remains the same, depending on whether it is dropping or rising.

In modern manufacturing technology there is an increasing demand in particular to produce the inner surface area of cylinders in the quickest and most accurate possible manner with respect to dimensions, so that the surface contour deviates from an exactly cylindrical surface area by a maximum of 500 to 1,000 with a tolerance in the $1\mu$ range $\pm 50\%$, depending on the path of the cutting chisel parallel to the axis of rotation and on its angle of rotation relative to the work piece. Thus, such out-of-center holes whose surface accordingly exhibits a polar and/or axial deviation from an axially parallel straight line or axially concentric circle cannot be produced by such a drill head.

For this purpose, provided that the control pressure source furnishes the necessary control pressure at the correct time and at the correct level, the mechanical adjusting or operating means must be constructed in such a way that the cutting chisel can follow the control pressure with sufficient accuracy and without hysteresis and, further, the inherent frequency of the drill head which is influenced by the rigidity or stiffness of the mechanical operating means must lie well above the control pressure frequency. Even a slight difference between these frequencies leads to resonance phenomena which render the drill head unusable above this frequency range.

To prevent troublesome frictional forces and maintain the desired rigidity of the mechanical operating means, it is known to construct the drive member and boring bar in one piece (see DE 39 29 472-A1, FIG. 1).

To this end, the drill head includes a flat rotating part having a circular cross section and divided into two portions by an eccentric recess or groove, namely into a portion forming a thin plate and a portion forming a thick plate, these portions being connected with one another by the eccentric portion formed by the groove. The relatively thin plate resulting from the groove is springing or resilient relative to the comparatively thick plate and simultaneously serves as a movable pressure seal for a compression motor, whose rigid base forms the thick plate or disk. In addition, the thin plate has a continuation which faces away and has a cylindrical outer surface area in which a piston-shaped continuation engages, the latter being constructed in one piece with the boring bar. This piston-shaped continuation forms the driven member and is securely connected with the thin plate by screws. Due to the eccentricity of the remaining portion between the thick and thin plates, a change in pressure of the pressure medium supplied to the compression motor results in a driven path in the $\mu$ range which is determined by the path of the driven center of gravity of the thin plate relative to the thick plate.

Although such a drill head has no structural component parts in a frictional engagement with one another and its mechanical operating members are sufficiently stiff, the manufacturing cost is considerable, as the thickness of the thin plate formed by the eccentric groove must have very accurate dimensions while taking into account the fact that with linearly increasing thickness, the increase in stiffness is greater than a linear increase, i.e. to approximately the third power. If a stiffness with a tolerance of 1% is aimed for, the thickness of the thin plate must be produced with a tolerance of approximately 0.33%. If the reference or desired thickness is 5 mm, for example, the tolerance must accordingly be approximately $16\frac{2}{3}\mu$. It will be understood that this tolerance can be achieved with a recessing tool only by taking special steps.

In addition, such a drill head has the following disadvantage:

As is well known, the necessary mechanical work for the displacement of the cutting chisel is the product of force times distance and the force is determined by the available pressure per surface area unit multiplied by the effective surface area of the hydraulic motor. Further, it is demanded of any cutting chisel holder that the spring stiffness between the chucking or clamping region and the cutting chisel be as great as possible, e.g. one ton/mm, and the cutting chisel should be capable of displacement by the greatest possible distance, e.g. $500\mu$. Therefore, the largest possible effective surface of the hydraulic motor is desired for furnishing the necessary force. On the other hand, the working space for such drill heads for reworking or subsequent machining of inner surface areas to precise dimensions is very limited as a rule and the geometrical lo dimensions of the drill heads are subject to strict limitations.

In the drill head known from DE 39 29 472-A1, FIGS. 4 and 5, the bending springs necessary for the pivoting of the driven member already require e.g. approximately half of the available region of the cross-sectional surface of the drill head, so that there is little available effective surface for the pressure chamber, which causes a reduction in spring stiffness at a given maximum work pressure of the pressure medium.

OBJECTS AND SUMMARY OF THE INVENTION

The present invention has as an object providing a solution for the above problem by means of a novel construction of the mechanical connecting means between the driven member having the boring bar and the base of the drill head.

The present invention has as a further object of providing a solution for the above problem by means of a novel construction of a drill head which includes the boring bar and driven member and works without frictional engagement, in which the mechanical operating means are constructed so as to be sufficiently stiff and can be produced in a simple manner with great accuracy so as to achieve movements of the driven member which are as parallel as possible.

Based on a drill head of the above-mentioned type, these objects are met according to the invention in that the driven member, the tappet, and the boring bar form parts which are connected with one another without friction.

According to a further feature of the invention, an axially parallel and eccentric bore hole is arranged in the tappet in such a way that an approximately axially parallel movement of the driven member is compelled by a deflection of the tappet acting counter to the deflection of the boring bar as the pressure medium takes effect. The dimensions and arrangement of the tappet and boring bar are advantageously selected in such a way that the elastic deformation of the tappet in the axial direction is approximately equal to the elastic deformation of the boring bar in the axial direction.

Further, according to the invention, the eccentric pocket bores of the boring bar and tappet are so arranged and dimensioned that the elastic or bending line of the tappet is equal to or approximately equal to the bending line of the boring bar so that there are no, or only small, axially vertical forces occurring between the tappet and boring bar.

In the simplest case, the driven member and tappet are constructed so as to form one piece, but to the extent that they can be sufficiently rigidly connected with one another they can also be produced as separate structural component parts.

Such a boring bar satisfies the above-mentioned demands to a high degree, since the individual structural component parts can be produced with high precision in a simple manner and, as a result of their geometrical design, provide an approximately parallel movement of the driven member and the greatest possible diameter for the pressure chamber and accordingly the maximum volumetric capacity for the pressure medium with given geometric dimensions of the drill head. As the pressure medium takes effect, the tappet is acted upon by pressure and the boring bar is acted upon by tensile force so that the tappet and boring bar tend to incline toward their thinner and thicker sides, respectively, and to deform in an elastic manner to an approximately equal degree in the radial direction. To this end, the tappet and boring bar are dimensioned in such a way that the deformation of the tappet in the axial direction is approximately equal to the elastic deformation of the boring bar in the axial direction.

The invention is described in the following with reference to an embodiment example shown more or less schematically in the drawing. The scope of the invention will be pointed out in the appended claims.

BRIEF DESCRIPTION OF THE DRAWING

The drawing depicts, in cross section and in a schematic type representation a rotating drill head in accordance with the invention.

DESCRIPTION OF THE PREFERRED EMBODIMENTS

A rotating drill head, designated in its entirety by 10, includes a clamping part 11, shown in cross section, with a cylindrical continuation 13 as part of a tool changing system, not shown in the drawing, and a cylindrical boring bar 12 which has a flange 14 at its end facing the clamping part. The flange 14 has a centric continuation 16 defining a cylindrical recess 15 and engages with this continuation 16 in a recess 17 of the facing end of the clamping part 11. The clamping part 11 and the boring bar 12 are securely connected so as to contact one another at their radially projecting, flange-like edges 21 and 22 by threaded screws 23.

The boring bar 12 has an axially parallel, eccentric pocket bore 24 with a planar end side in which a cylindrical tappet 26 engages. The end of the tappet 26 facing the clamping part 11 projects radially and forms a piston-shaped driven member 28 which engages in the cylindrical recess 15 of the boring bar 12 with predetermined clearance or play. The end 27 projecting into the pocket bore contacts the planar end face 25 of the pocket bore with surface area contact.

The tappet 26 also has an axially parallel, eccentric pocket bore hole 29 which is sealed by an end piece 32 relative to the pressure chamber formed by the end sides 35 and 36 of the driven member 28 and recess 17.

The cylindrical recess 15 at the remote end of the boring bar 12, the facing cylindrical recess 17 in the clamping part 11, and the thickness of the piston-shaped driven member 28 are dimensioned in such a way that the tappet 26 can execute its maximum stroke of several hundred $\mu$m vertical to the axis as a pressure medium fed into the aforementioned pressure chamber through an inlet opening 60 takes effect at its maximum pressure.

A guide 39 is arranged between the tappet 26 and the wall of the pocket bore 24 in a groove 37 located at the free end of the pocket bore 24.

An additional seal 40 comprising an 0-ring 41 and a lip ring 42 is located in an annular recess 44 at the cylindrical outer surface area 45 of the driven member 28 between the driven member and the cylindrical surface area 46 of the recess 15. One wall of the recess 44 is formed by a disk 47 which is inserted into a corresponding circular recess 48 at the end face 35 of the driven member 28 so as to be flush with the end face 35 and is fastened by threaded screws 49.

A cylinder pin 50, one of whose ends 51 is fixed in a bore hole 52 proceeding from the end face 53 of the recess 15, engages with its free end 54 in a pocket bore 55 of the facing surface 56 of the driven member 28 and prevents a rotational movement of the tappet 26 during operation so that the geometric correspondence of the tappet and boring bar shown in the drawing is maintained.

Further, a seal 57 is provided between the outer surface area of the continuation 16 and the inner surface area of the recess 17, as well as a seal 58 between the facing end walls of the edges 21 and 22 of the boring bar and clamping part.

Finally, a flow-off bore 62 is provided which connects the pocket bore 24 located in the boring bar 12 to the atmosphere.

The boring bar 12 carrying a cutting chisel 18 and its pocket bore 24, the tappet 26 and its pocket bore hole 29, and the effective surface of the driven member 28 exposed to the pressure medium are dimensioned in such a way that as the pressure medium takes effect in the pressure chamber defined by the end sides 35 and 36 of the driven member 28 and recess 17 in the clamping part 11, the elastic deformation of the tappet 26 in the axial direction, the latter being acted upon by pressure, is approximately equal to the elastic deformation of the boring bar 12 in the axial direction, the latter being acted upon by a tensile force, and the eccentric pocket bores 24 and 29 are arranged in such a way that the bending lines of the tappet 26 are equal to or approximately equal to the bending line of the boring bar 12, so that there can be no, or only small, forces acting vertically to the axis between the tappet and boring bar. In this way, a virtually axially parallel movement of the driven member is compelled and the risk of jamming of the driven member in the recess 15 and of the tappet and boring bar is accordingly prevented.

Since the thinner wall 64 of the boring bar 12 and the thinner wall 65 of the tappet 26 are more stretched or compressed, respectively, than the thicker wall as the pressure medium takes effect, the tappet and boring bar are bent in the direction of the thinner or thicker wall, respectively, wherein it is ensured that the bending line of the tappet is equal to or virtually equal to the bending line of the boring bar so that no, or only small, forces act vertically to the axis between the tappet and boring bar.

As the pressure medium takes effect, as described above, the cutting chisel 18 is moved out of the rest position shown in the drawing in the direction of the arrow 63 on a curved path in the range running approximately vertically relative to the axis 70 of rotation. The described arrangement and construction of the driven member, tappet and boring bar ensure that the movement of the cutting chisel is greater than the path of the driven center of gravity of the driven member 28 relative to the base formed by the clamping part 11, this path being brought about by the change of pressure.

The control pressure source required for generating the necessary control pressure is neither shown nor described, as it does not make up part of the invention and is known per se.

While the foregoing description and drawings represent the preferred embodiments of the present invention, it will be obvious to those skilled in the art that various changes and modifications may be made therein without departing from the true spirit and scope of the present invention.

What is claimed is:

1. In a cutting chisel holder for holding a cutting chisel and which functions as a rotary drill head, said chisel holder being precisely adjustable by hydraulic means and including a base, a resilient driven member which is sealed relative to the base, a fluid pressure-medium chamber having a fluid inlet, the chamber being arranged between the base and the driven member, stiffening means, and a boring bar having an eccentrically bored recess for receiving the stiffening means, the stiffening means being movable by the driven member in such a way that the cutting chisel moves around a curved path running vertically relative to the plane of rotation, the improvement comprising the stiffening means being connected to the driven member and the boring bar being connected to the driven member.

2. The cutting chisel holder according to claim 1, wherein the stiffening means has a first bending line and the boring bar has a second bending line, the first bending line being approximately equal to the second bending line for the purpose of preventing forces in the boring bar from acting vertically to the rotational axis.

3. The cutting chisel holder according to claim 1, wherein the stiffening means includes an axially parallel and eccentric bore hole which is sealed relative to the pressure chamber.

4. The cutting chisel holder according to claim 1, wherein the stiffening means has a first rigidity and the boring bar has a second rigidity, the first and second rigidities being selected so that elastic deformation of the stiffening means in the axial direction is approximately equal to elastic deformation of the boring bar in the axial direction.

5. The cutting chisel holder according to claim 1, wherein the stiffening means and the driven member are constructed so as to form one piece.

* * * * *